United States Patent [19]
Mitsuhiko

[11] Patent Number: 5,363,439
[45] Date of Patent: Nov. 8, 1994

[54] DTMF SIGNAL RECEIVING SYSTEM

[75] Inventor: Noda Mitsuhiko, Kyoto, Japan

[73] Assignee: Rohm Co., Ltd., Kyoto, Japan

[21] Appl. No.: 234,702

[22] Filed: Apr. 28, 1994

Related U.S. Application Data

[63] Continuation of Ser. No. 879,797, May 6, 1992, abandoned.

[30] Foreign Application Priority Data

May 14, 1991 [JP] Japan .................. 3-107978

[51] Int. Cl.$^5$ .......................................... H04M 11/00
[52] U.S. Cl. ...................... 379/386; 379/388; 379/98
[58] Field of Search ............... 379/386, 97, 368, 98, 379/99, 339, 282, 283

[56] References Cited

U.S. PATENT DOCUMENTS

| | | | |
|---|---|---|---|
| 4,602,131 | 7/1986 | Soulliard et al. | 379/386 |
| 4,868,872 | 9/1989 | Roberts et al. | 379/386 |
| 5,163,084 | 11/1992 | Kim et al. | 379/97 |
| 5,172,406 | 12/1992 | Locke | 379/88 |
| 5,186,471 | 2/1993 | Vancraeynest et al. | 273/439 |

Primary Examiner—James L. Dwyer
Assistant Examiner—Jacques M. Saint-Surin
Attorney, Agent, or Firm—Koda and Androlia

[57] ABSTRACT

The specification describes a system for receiving DTMF signals from the telephone network. The DTMF signals are inputted into a decoding circuit and a detecting circuit. As the detecting circuit is outputting a detection signal, a data requesting circuit provides a plurality of data request signals to the decoding circuit at a given cycle. The decoding circuit outputs decoded data each time when a data request signal is inputted thereinto. A discriminating circuit identifies and selects decoded data having the highest reliability from the plurality of decoded data. An instrument control circuit controls one or more instruments, based on the selected decoded data. Since a plurality of decoded data are obtained for each DTMF signal and a decoded data having the highest reliability is selected from these decoded data, the instrument(s) can be accurately controlled without any malfunction.

10 Claims, 7 Drawing Sheets

DTMF SIGNAL RECEIVING SYSTEM

This is a continuation of application Ser. No. 07/879,797, filed May 6, 1992, now abandoned.

BACKGROUND OF THE INVENTION

1. Field of the Invention

The present invention relates to a system for receiving DTMF signals from telephone networks.

2. Description of the Related Art

It is known in the art that dual tone multi frequency (DTMF) signals are used as destination selecting signals. The typical telephone set incorporates a device for transmitting the DTMF signals. The telephone exchange connects a telephone line to another telephone line, in accordance with DTMF signals which have been transmitted from a telephone set to the telephone line.

For example, a DTMF signal is a combination of one frequency from the group of frequencies consisting of 1209 Hz, 1336 Hz, 1477 Hz and 1633 Hz with one frequency from another group of frequencies consisting of 697 Hz, 770 Hz, 852 Hz and 941 Hz. Such combinations represent numerals "0" through "9" etc.

In recent years, the DTMF signals have been frequently used as signals for controlling various instruments. For example, if a preselected password consisting of DTMF signals is transmitted from an outdoor telephone set to an indoor telephone set, any instrument connected with the indoor telephone set (e.g. air-conditioner or video tape recorder) can be remotely controlled by the DTMF signals. The DTMF signal receiving system is incorporated, for example, into an automatic answering telephone set or the like.

FIG. 1 illustrates the operation of a conventional DTMF signal receiving system. When a DTMF signal 100 is detected by a detector (not shown), the detector outputs a detection signal 102. The occurrence of the detection signal 102 causes a control circuit (not shown) to output a data request signal 103. On the other hand, the inputted DTMF signal 100 is converted by a decoding circuit (not shown) into 4-bit decoded data which is in turn supplied to a shift register (not shown). The data request signal 103 consists of four pulses and is inputted into the shift register. Each time a pulse 103a is inputted into the shift register, the latter serially outputs one bit to a decoding circuit 104. Thus, only one data request signal 103 is outputted from the control circuit when one DTMF signal is received by the DTMF signal receiving system.

However, if an undesirable DTMF signal 100 having a discontinuous point 106 is received by the DTMF signal receiving system due to the depression of a wrong button or some other spurious operation as shown in FIG. 2, properly decoded data cannot be produced.

As shown in FIG. 2, the undesirable DTMF signal 100 includes a forward signal section 100a representing "#n" and a rearward signal section 100b representing "#n+1", these signal sections being separated by the discontinuous point 106.

It is not unusual that when an operator intends to depress a particularly button, he falsely touches another button adjacent to the particular button. This will produce an undesirable DTMF signal 100 having such a discontinuous point 106. When this undesirable DTMF signal is received by the conventional DTMF signal receiving system, the latter finally obtains only decoded data "#n", but not desired decoded data "#n+1" which is inherently to be transmitted to the DTMF signal receiving system.

If such a DTMF signal is used to control an instrument remotely, this will lead to the instrument malfunctioning. This is also true of a DTMF signal containing noise.

It is therefore an object of the present invention to provide a DTMF signal receiving system which can obtain properly decoded data from an undesirable DTMF signal having the discontinuous point and/or noise.

SUMMARY OF THE INVENTION

To this end, the present invention provides a DTMF signal receiving system comprising means for detecting an inputted DTMF signal to generate a detection signal in response to the input of the DTMF signal. During the output of this detection signal, data request means outputs a plurality of data request signals. On the other hand, decoding means decodes the DTMF signal to output the decoded data in parallel.

The DTMF signal receiving system further comprises a parallel/serial data converting means for converting the parallel decoded data into serial decoded data which is in turn outputted from the serial/parallel data converting means when a data request signal is inputted thereinto.

The DTMF signal receiving system further comprises means for discriminating the decoded data having the highest reliability among a plurality of such serial decoded data.

Thus, a plurality of decoded data can be obtained for a single DTMF signal. Among these decoded data, decoded data which appears to have the highest reliability can be selected and used for an instrument as a control signal. As a result, the DTMF signal receiving system can be prevented from causing a malfunction due to spurious operation of the button or the like.

DETAILED DESCRIPTION OF THE PREFERRED EMBODIMENTS

Some preferred embodiments of the present invention will now be described with reference to the drawings.

First Embodiment

Figure 1:
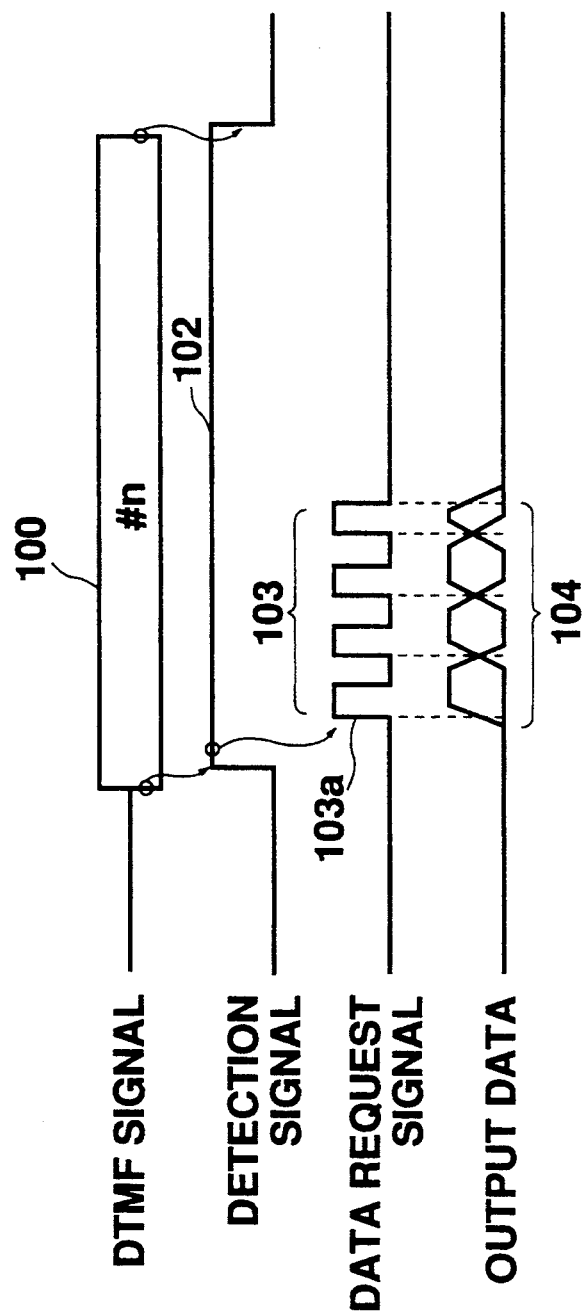
FIG. 1 is a timing chart illustrating the normal operation in a conventional DTMF signal receiving system.
Figure 2:
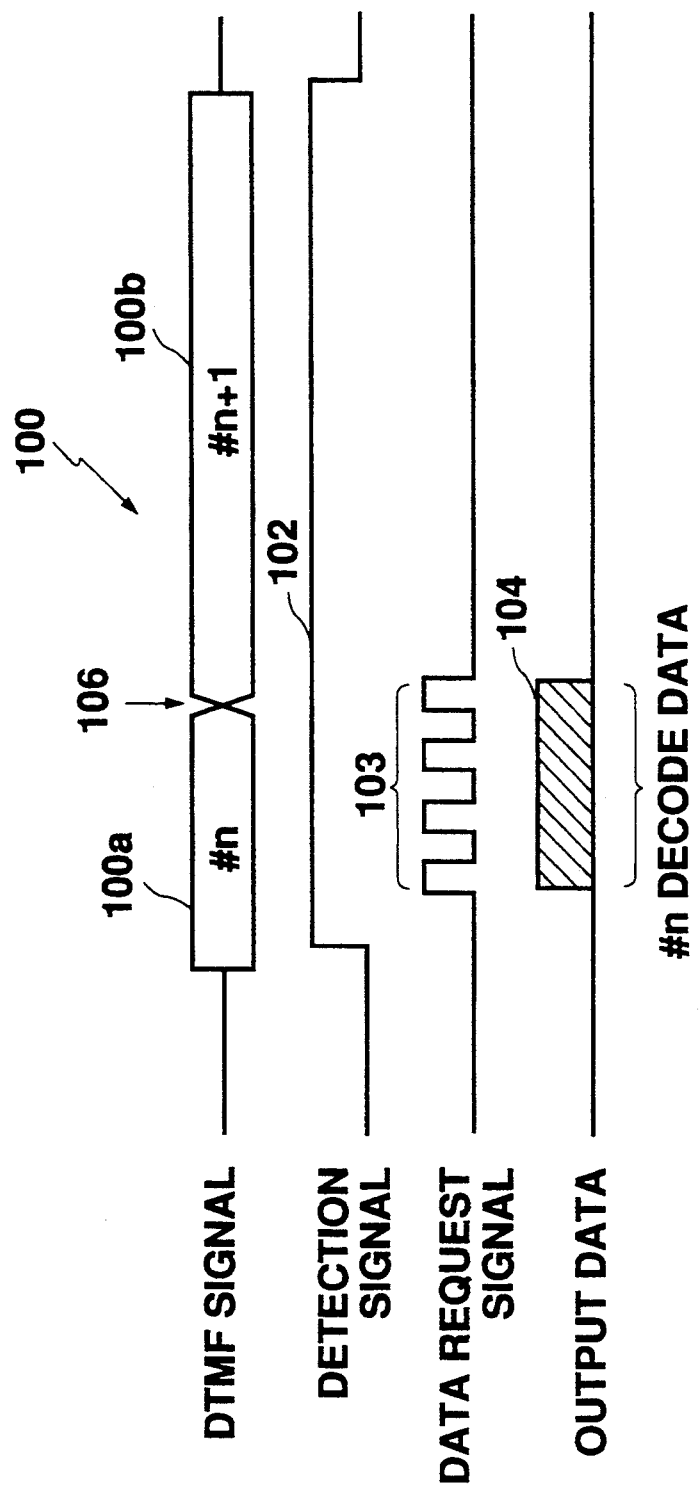
FIG. 2 is a timing chart illustrating the operation of the conventional DTMF signal receiving system when it receives a DTMF signal having a discontinuous point.
Figure 3:
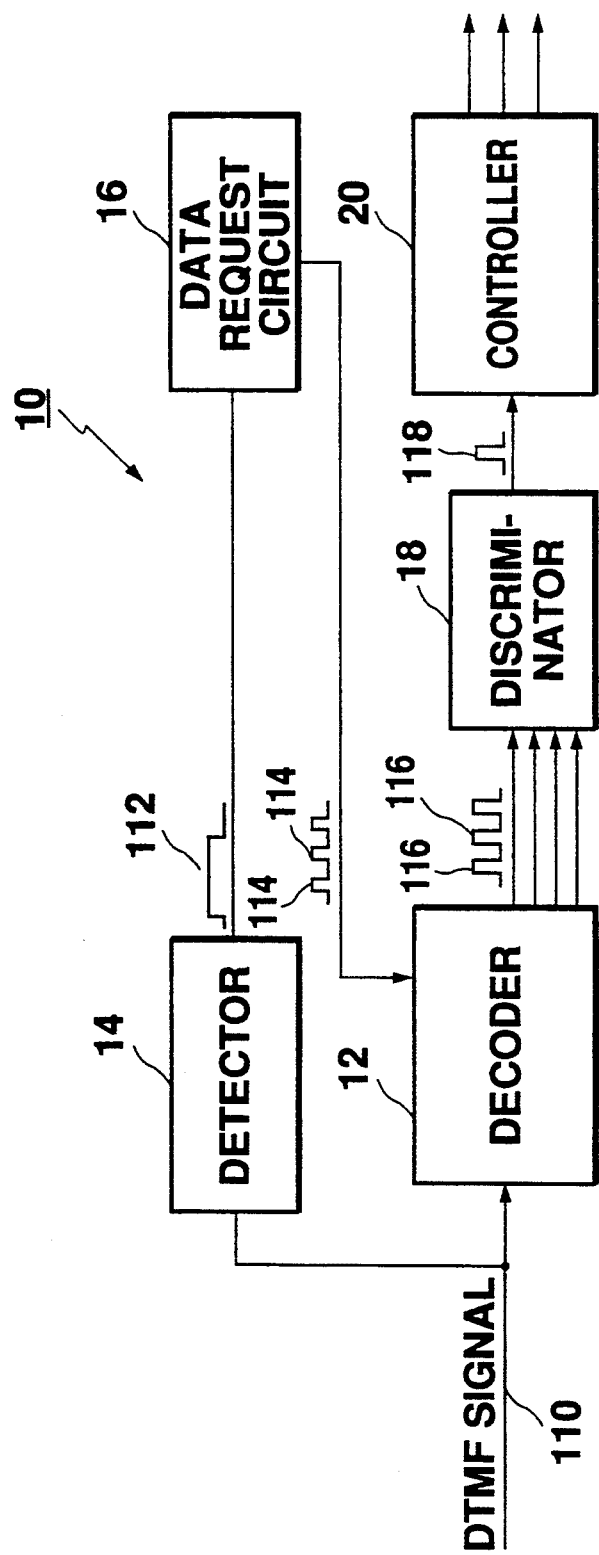
FIG. 3 is a block diagram of one embodiment of a DTMF signal receiving system constructed in accordance with the present invention.

Referring now to FIG. 3, there is shown the first embodiment of a DTMF signal receiving system constructed in accordance with the present invention. The DTMF signal receiving system 10 comprises a decoding circuit 12 which receives a DTMF signal 110 through a filter circuit (not shown) and then converts the DTMF signal 110 into four-bit decoded data.

The DTMF signal receiving system 10 also comprises a detecting circuit 14 which outputs a detection signal 112 when it receives the DTMF signal 110. If the detection signal 112 is in the "Hi" state, it shows that the detecting circuit 14 has received the DTMF signal. If the detecting circuit 14 receives no DTMF signal, the state of the detection signal 112 becomes "Lo".

The DTMF signal receiving system further comprises a data requesting means 16 for outputting data request signals 114 to the decoding circuit 12 at a given cycle T2 (e.g. a few kHz several tens kHz) when the detection signal 112 is in its "Hi" state. Normally, several data request signals 114 are outputted from the data requesting circuit 16 for each DTMF signal.

The decoding circuit 12 outputs decoded data 116 each time it receives a data request signal 114. In the first embodiment, each decoded data 116 is a four-bit data.

Thus, the discriminating circuit 18 will receive a plurality of decoded data 116 for each DTMF signal 110, which it discriminates and selects the decoded data having the highest reliability the selected decoded data 18.

The DTMF signal receiving system further comprises a control circuit 20 for controlling an instrument (e.g. an air-conditioner) in accordance with the selected decoded data 118. In such a manner, the instrument can be accurately controlled only by the control signal having the highest reliability.

Second Embodiment

Figure 4:
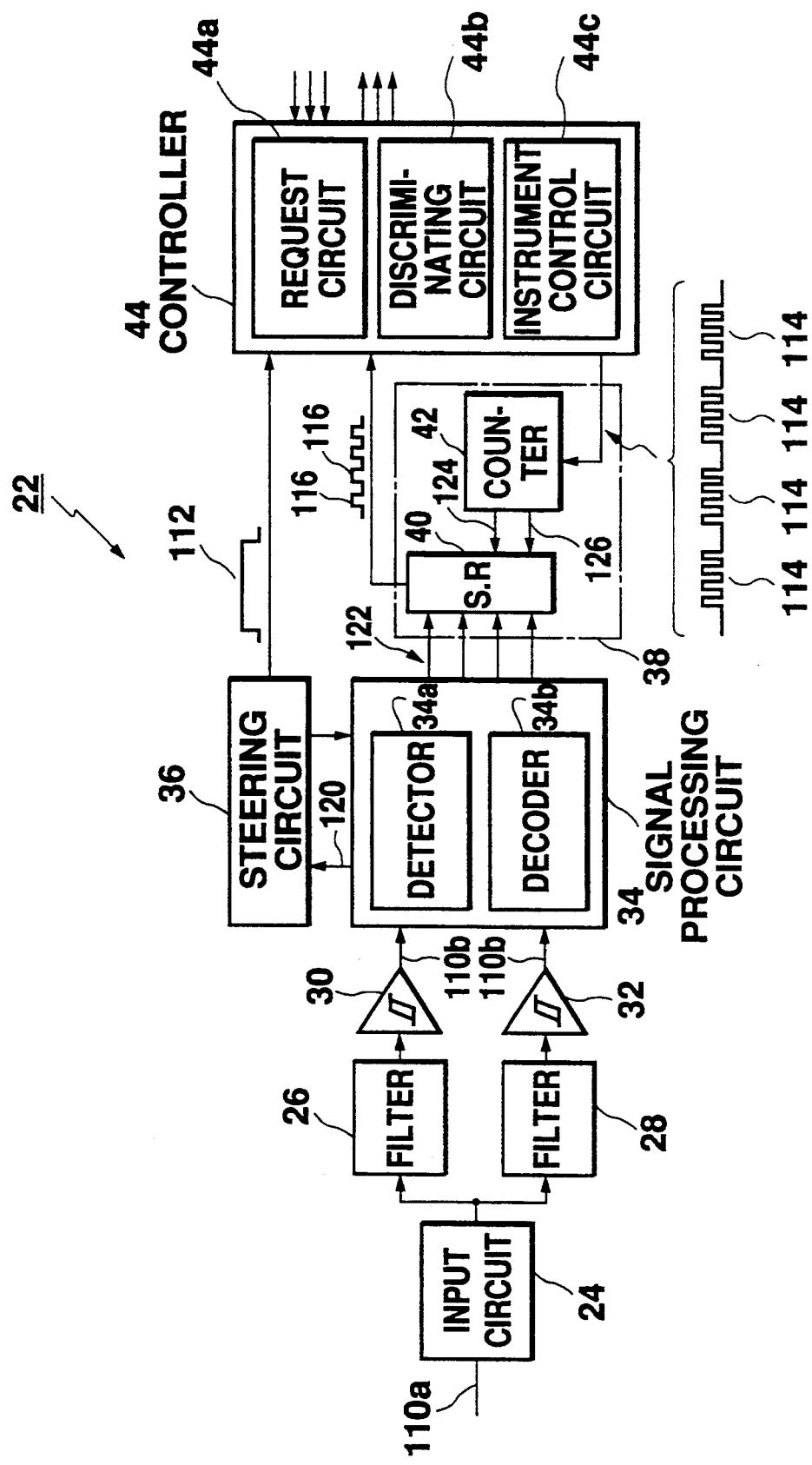
FIG. 4 is a block diagram of another embodiment of a DTMF signal receiving system constructed in accordance with the present invention.

Referring next to FIG. 4, there is shown the second embodiment of a DTMF signal receiving system 22 constructed in accordance with the present invention. The DTMF signal receiving signal 110a from a telephone line. This input circuit 24 is of the same structure as that of the conventional input circuits and comprises a 60 Hz notch filter, an AGC circuit, an anti-aliasing filter, a dial-tone filter and so on.

The DTMF signal passed through the input circuit 24 enters high and low band pass filters 26 and 28 and also comparators 30 and 32 for judging the zero crossing. These comparators 30 and 32 then output binary coded DTMF signals 110b, respectively. The filters 26, 28 and comparators 30, 32 are also of the same structure as those of the conventional filters and comparators.

Two divided DTMF signal signals 110b having different frequency bands are then fed to a signal processing circuit 34 which performs the detecting and decoding of the DTMF signal. The signal processing circuit 34 comprises a detecting circuit 34a for activating an enable signal 120 when it detects a valid DTMF signal, and a decoding circuit 34b for converting the DTMF signal into 4-bit parallel decoded data 122.

The DTMF signal receiving system 22 further comprises a steering circuit 36 for outputting a detection signal 112 when the enable signal 120 is active. In other words, the detection signal 112 is maintained at its "Hi" state when the DTMF signal 110 is being received.

The DTMF signal receiving system further comprises a parallel/serial converting circuit 38 which comprises a shift register 40 and a counter 42. The shift register 40 is adapted to convert the 4-bit parallel decoded data 122 into a 4-bit serial decoded data 116.

The counter 42 is a 3-bit counter which counts pulses defining a data request signal 114 and its operation will now be described. Depending on its counts, the counter 42 changes the shift register 40 from one mode to another mode, these modes including a shift mode and a latch mode. The counter 42 provides a mode select signal 124 and a shift clock 126 to the shift register 40.

The counter 42 detects the rising edge of the first pulse and the falling edge of the fourth pulse in the data request signal 114. The counter 42 puts the shift register 40 into the shift mode for a time period between the leading edge of the first pulse and the trailing edge of the fourth pulse in the data request signal 114. For the respective time periods other than between these leading and trailing edges, the counter 42 puts the shift register 40 into the latch mode. The counter 42 is reset as it detects the trailing edge of the fourth pulse in a shift pulse 206.

The DTMF signal receiving system further comprises a control circuit 44 for controlling various instruments in accordance with the decoded data 116. The control circuit 44 comprises a data requesting circuit 44a, a discriminating circuit 44b and an instrument controlling circuit 44c.

The data requesting circuit 44a repeatedly outputs the data request signals 114 to the shift register circuit 24 at a given cycle T2 (e.g. several kHz—tens of kHz) only when the detection signal 112 of the steering circuit 36 continues to be in its "Hi" state. As a result, the control circuit 44 will receive a plurality of decoded data 116 for each DTMF signal which is defined by 4-bit pulses (e.g. the pulse cycle T1=1 microsecond).

The discriminating circuit 44b will be described in connection with its operation.

Figure 6:
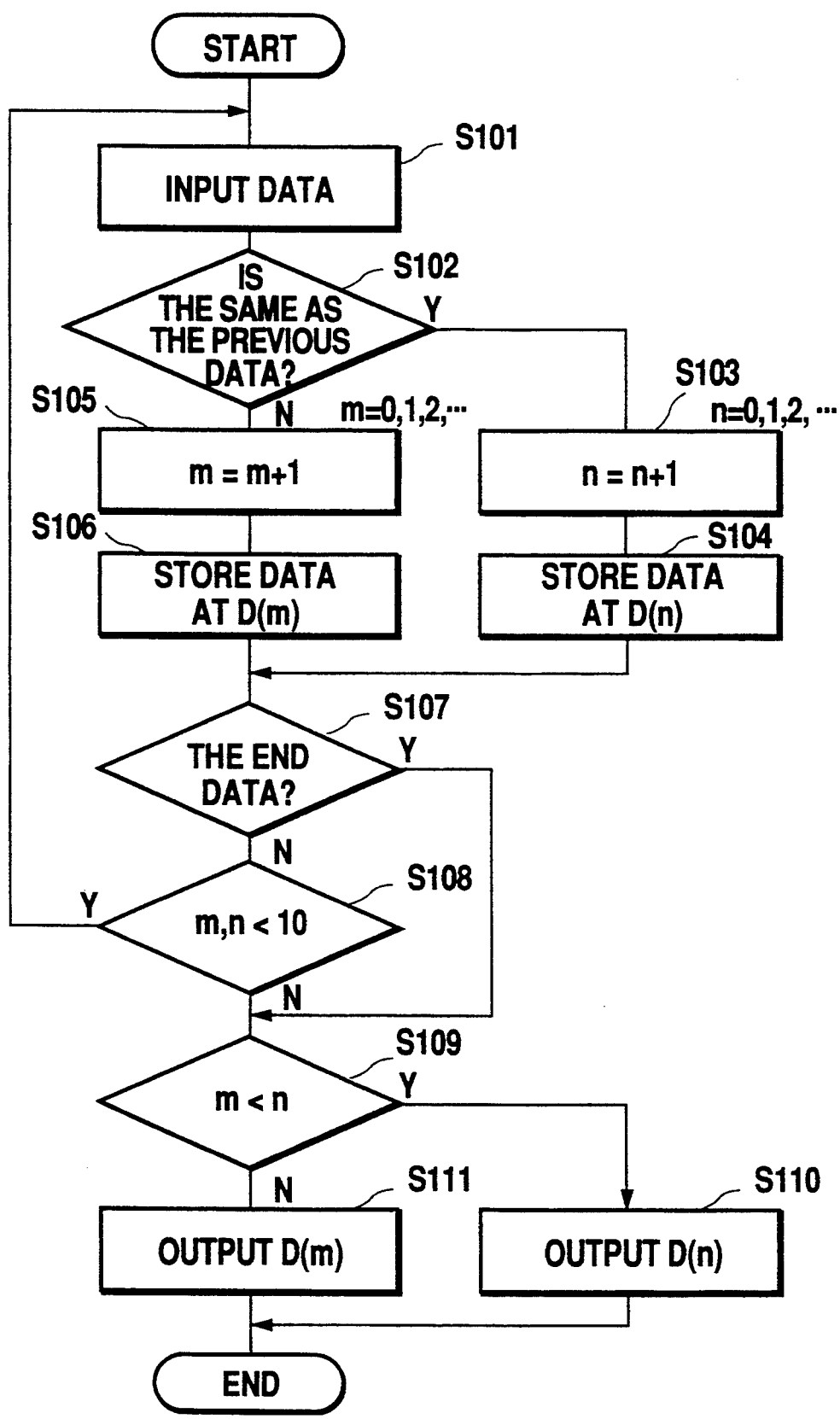
FIG. 6 is a flowchart illustrating the first example of the operation of the discriminating circuit.

FIG. 6 shows the first example of a discriminating process for judging that decoded data 116 having the largest numeral value is most reliable. The process of FIG. 6 is a case where two different decoded data 116 are obtained for each DTMF signal. It is of course possible to similarly use the processof FIG. 6 even if three different decoded data are provided for each DTMF signal, the process of FIG. 6 can be similarly used.

Referring to FIG. 6, decoded data 116 is inputted into the discriminating circuit 44b at S101. It is judged at S102 whether or not the decoded data just inputted is the same the previously inputted decoded data. If "Yes", one (1) is added to "n" to provide "n+1" at S103. At S104, the inputted decoded data is stored in D(n). If that decoded data is the first to be inputted into the discriminating circuit 44b, the process goes directly from S101 to S103.

If "No" at S102, one is added to "n" at S105 and the inputted decoded data is stored in D(m) at S106, as in S103 and S104.

It is judged at S107 whether or not the currently inputted decoded data is the final item of data. If "Yes", the process jumps to S109.

At S108, it is judged whether or not each of m or n is larger than 10 where this coefficient "10" is any numeral representing the number of decoded data which have been judged.

If "Yes" at S108, the next decoded data is inputted into the discriminating circuit at S101. The aforementioned cycle will be repeated.

On the other hand, if "No" at S108, it is judged at S109 whether or not n is larger than m. If "Yes", the decoded data stored in D(n) are outputted at S110. If "No" at S109, the decoded data stored in D(m) are outputted at S111.

Therefore, the decoded data outputted from the discriminating circuit 44b is that which has the largest numerical value and is most reliable.

Figure 7:
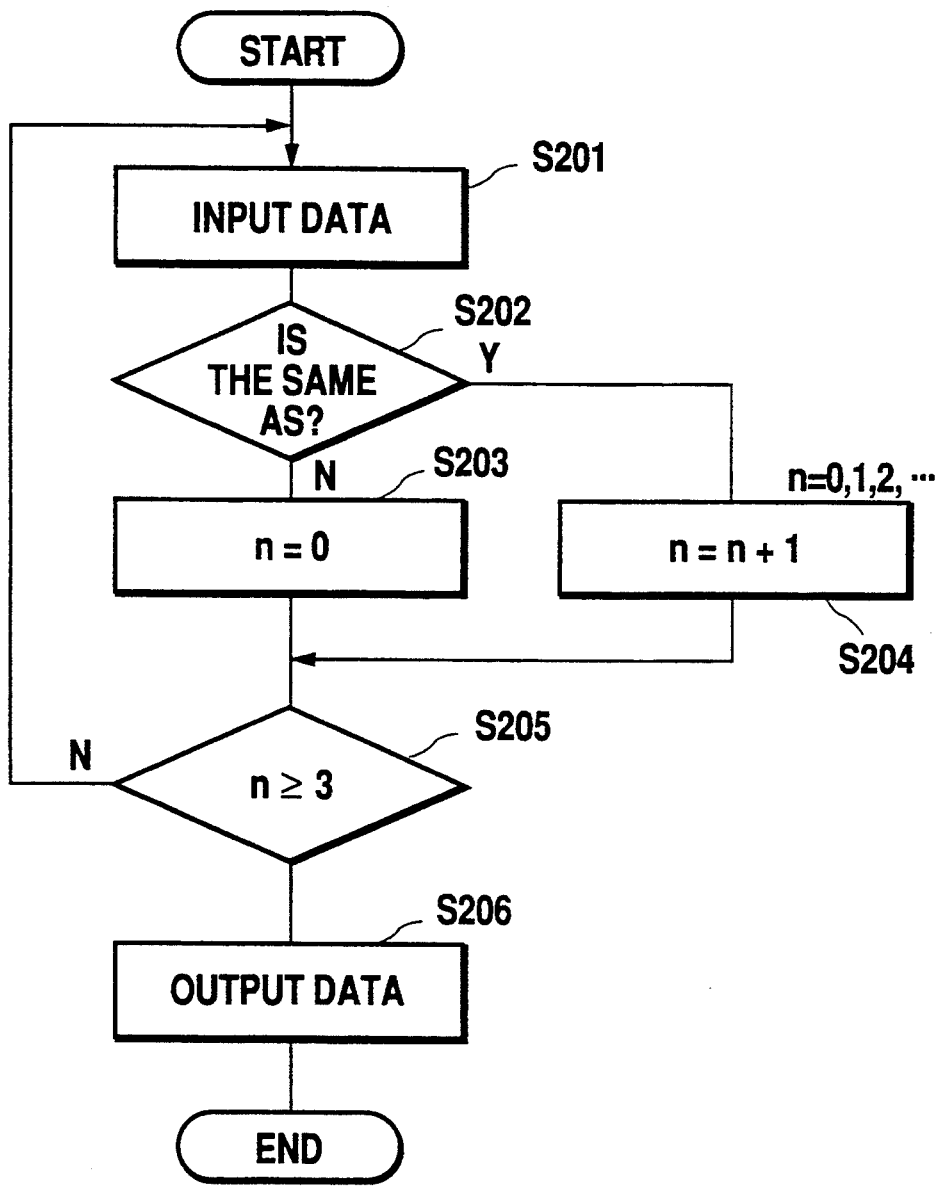
FIG. 7 is a flowchart illustrating the second example of the operation of the discriminating circuit.

FIG. 7 illustrates the second example of a discriminating process according to the present invention, which is adapted to judge that when a predetermined number of decoded data (e.g. three) are continuously inputted into the discriminating circuit, the decoded data has the highest reliability.

At S201, decoded data 116 is inputted into the discriminating circuit. It is then judged at S202 whether or not the decoded data now inputted is the same as the previously decoded data. If "No", n=0 is executed at S203. If "Yes", n=n+1 is executed at S204. If the decoded data is the first to be inputted into the discriminating circuit, the process jumps from S201 to S204.

At S205, it is judged whether or not is equal to or larger than three (3). If "No", the aforementioned cycle is repeated starting from S201. If "Yes", the decoded data at that time are outputted at S206. If three or more decoded data have the same content, it is judged that the decoded data are reliable.

The operation of the second embodiment of a DTMF signal receiving system constructed in accordance with the present invention will be described with reference to FIGS. 4 and 5.

Figure 5:
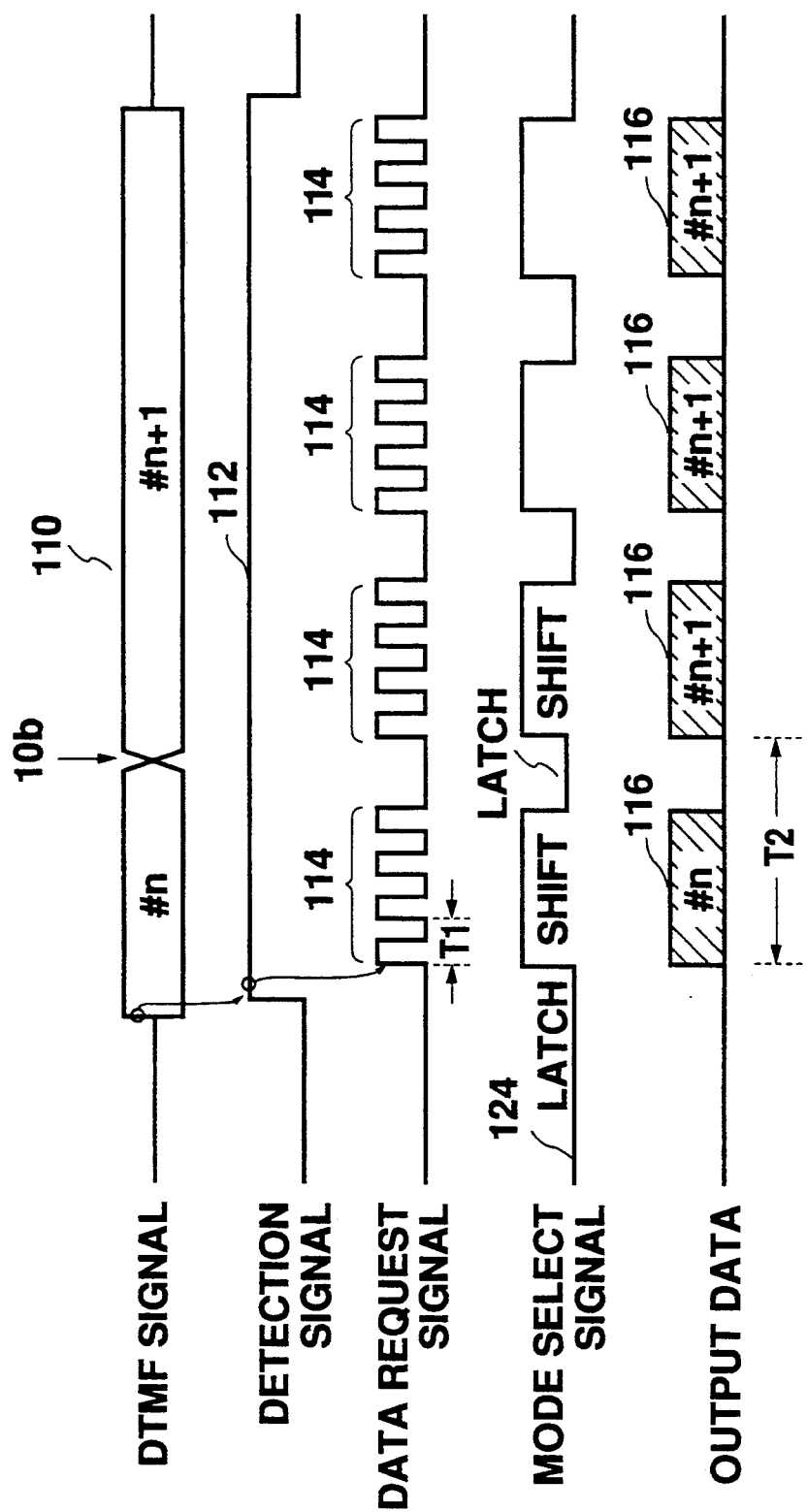
FIG. 5 is a timing chart illustrating the operation of the DTMF signal receiving system of the present invention.

In FIG. 5, when a DTMF signal 110 is inputted into the detecting circuit 34a, the latter renders the enable signal 120 active. This causes the steering circuit 36 to output the detection signal 112. When this detection signal 112 is being outputted, data request signals 114 are repeatedly outputted from the control circuit 44 at a given cycle. These data request signal 114 are inputted into the counter 42. At the same time as the counter 42 detects the leading edge of the first pulse, it provides a mode select signal 124 specifying the shift mode to the shift register 40. The shift register 40 is then placed in its shift mode to output the decoded data 116 by one bit for each input of shift pulse 126.

When the counter 42 receives the fourth pulse in the data request signal 114, the counter 42 generates a mode select signal 124 specifying the latch mode. The shift register 40 is then placed in its latch mode to fetch the 4-bit parallel decoded data outputted from the decoding circuit 34b.

The aforementioned cycle is repeated several times for each reception of DTMF signal. In such a manner, the control circuit 44 will receive a plurality of decoded data 116.

FIG. 5 shows, at its lower half, four decoded data 116 obtained by the control circuit 44, that is, one data representing [#n] and three data representing [#n+1]. Thus, the discriminating circuit 44b selects one decoded data among these decoded data 116, which has probably the highest reliability. Based on the selected decoded data, the instrument controlling circuit 44c will control various instruments.

The discriminating process is not limited to those of FIGS. 6 and 7 and may be replaced by any one of the other suitable discriminating process. In any event, the DTMF signal receiving system of the present invention can obtain a plurality of decoded data for each DTMF signal, such that properly decoded data will be selected from these decoded data to control the instrument with an increased reliability. Even if a button is spuriously depressed or a DTMF signal contains any impulse noise, the instrument can be properly controlled without any adverse effects.

I claim:

1. A system for receiving DTMF signals from a telephone network, comprising:
   (a) detecting means for detecting said DTMF signals;
   (b) data requesting means for outputting a plurality of data request signals during each time period when said DTMF signals are detected by said detecting means;
   (c) decoding means for decoding said DTMF signals and for outputting decoded data each consisting of a plurality of bits in parallel;
   (d) data converting means for receiving the decoded data from said decoding means and for converting and outputting said decoded data as serial decoded data each time when one of said plurality of said data request signals is inputted into said data converting means; and
   (e) discriminating means for identifying and selecting a decoded data having a highest reliability among said serial decoded data from said data converting means.

2. A system as defined in claim 1, further comprising instrument control means for controlling at least one instrument in accordance with the decoded data selected by said discriminating means whereby erroneous control of said instrument is prevented.

3. A system as defined in claim 2 wherein said data converting means includes a shift register.

4. A system as defined in claim 3, further comprising mode control means operative in synchronism with said data request signals for changing the operational mode of said shift register from a shift mode to a latch mode or vice versa.

5. A system as defined in claim 4 wherein said decoding means converts each of said DTMF signals into 4-bit parallel decoded data.

6. A system as defined in claim 5 wherein said mode control means includes a 3-bit counter.

7. A system for receiving DTMF signals from a telephone network, comprising:
   (a) detecting means for detecting the DTMF signals;
   (b) data requesting means for outputting a plurality of data request signals during each time period when the DTMF signals are detected by said detecting means;
   (c) decoding means for decoding said DTMF signals and for outputting parallel decoded data each time when one of said plurality of data request signals is inputted into said decoding means;
   (d) data converting means for receiving the parallel decoded data from said decoding means and for converting and outputting said parallel decoded data as serial decoded data each time when each of said plurality of said data request signals is inputted into said data converting means; and
   (e) discriminating means for identifying and selecting a decoded data having a highest reliability among said serial decoded data from said data converting means.

8. A system as defined in claim 7, further comprising instrument control means for controlling at least one instrument in accordance with the decoded data selected by said discriminating means whereby erroneous control of said one instrument is prevented.

9. A system for receiving DTMF signals according to claim 1, wherein said discrimination means receives decoded data several times for each DTMF signal and said discriminating means identifies and selects said decoded data having high reliability on the basis of the number of times in which data contents of the decoded data are in agreement.

10. A system for receiving DTMF signals according to claim 7, wherein said discriminating means receives decoded data several times for each DTMF signal and said discriminating means identifies and selects said decoded data having high reliability on the basis of the number of times in which data contents of the decoded data are in agreement.

* * * * *